(12) United States Patent
Chuprevich et al.

(10) Patent No.: US 11,164,265 B1
(45) Date of Patent: Nov. 2, 2021

(54) USER INTERFACE FOR INTERFACING WITH MULTIPLE HUMAN USERS

(71) Applicant: Wells Fargo Bank, N.A., San Francisco, CA (US)

(72) Inventors: John Andrew Chuprevich, Davidson, NC (US); Eric M. Huitger, Charlotte, NC (US); Akiva D. Kates, Charlotte, NC (US); Ray G. Redwood, Charlotte, NC (US); Teresa Lynn Rench, Mount Holly, NC (US); Balin Kiva Brandt, Brooklyn, NY (US)

(73) Assignee: Wells Fargo Bank, N.A., San Francisco, CA (US)

( * ) Notice: Subject to any disclaimer, the term of this patent is extended or adjusted under 35 U.S.C. 154(b) by 445 days.

(21) Appl. No.: 15/956,280

(22) Filed: Apr. 18, 2018

(51) Int. Cl.
| | |
|---|---|
| *G06Q 40/02* | (2012.01) |
| *G06Q 20/10* | (2012.01) |
| *G06Q 40/00* | (2012.01) |
| *G06F 16/2457* | (2019.01) |

(52) U.S. Cl.
CPC ......... *G06Q 40/12* (2013.12); *G06F 16/2457* (2019.01); *G06Q 20/10* (2013.01)

(58) Field of Classification Search
CPC ............................. G06Q 20/108; G06Q 40/02

USPC ........................................................... 705/35
See application file for complete search history.

(56) References Cited

U.S. PATENT DOCUMENTS

| | | | | |
|---|---|---|---|---|
| 8,090,656 | B2* | 1/2012 | Solomon | ................ G06Q 40/00 705/42 |
| 9,854,616 | B2* | 12/2017 | Raphael | ................ H04W 8/186 |
| 2010/0191629 | A1 | 7/2010 | Olliphant | |
| 2014/0172704 | A1* | 6/2014 | Atagun | .................. G06Q 40/02 705/44 |
| 2015/0073959 | A1 | 3/2015 | Connors et al. | |
| 2016/0034863 | A1 | 2/2016 | Ross | |

* cited by examiner

*Primary Examiner* — Clifford B Madamba
(74) *Attorney, Agent, or Firm* — Schwegman Lundberg Woessner, P.A.

(57) ABSTRACT

Various examples are directed to systems and methods for interfacing a computing system to a plurality of users. A computing system may access goal data describing a financial goal and user data describing a first user associated with the financial goal and a second user associated with the financial goal. The computing system may determine a portion of a first user account associated with the first user that is allocated to the financial goal and a portion of a second user account associated with the second user that is allocated to the financial goal. The computing system may generate a graphical user interface and send the graphical user interface to a first user computing device associated with the first user and to a second user computing device associated with the second user.

20 Claims, 11 Drawing Sheets

USER INTERFACE FOR INTERFACING WITH MULTIPLE HUMAN USERS

TECHNICAL FIELD

Embodiments described herein generally relate to systems and methods for interfacing a computing device or system of computing devices to a human user. For example, embodiments described herein are directed to systems and methods for generating and/or serving a user interface for tracking deposits and expenses.

BACKGROUND

Computing technology permits the processing and management of large quantities of data at high speed. In the context of financial management, computing devices and systems of computing devices are capable of processing deposits, expenses, and other financial variables for users. The capabilities of computing technology, however, cannot be put to their best use unless the user is able to clearly understand the underlying processing.

DRAWINGS

In the drawings, which are not necessarily drawn to scale, like numerals may describe similar components in different views. Like numerals having different letter suffixes may represent different instances of similar components. Some embodiments are illustrated by way of example, and not of limitation, in the figures of the accompanying drawings.

DETAILED DESCRIPTION

Figure 1:
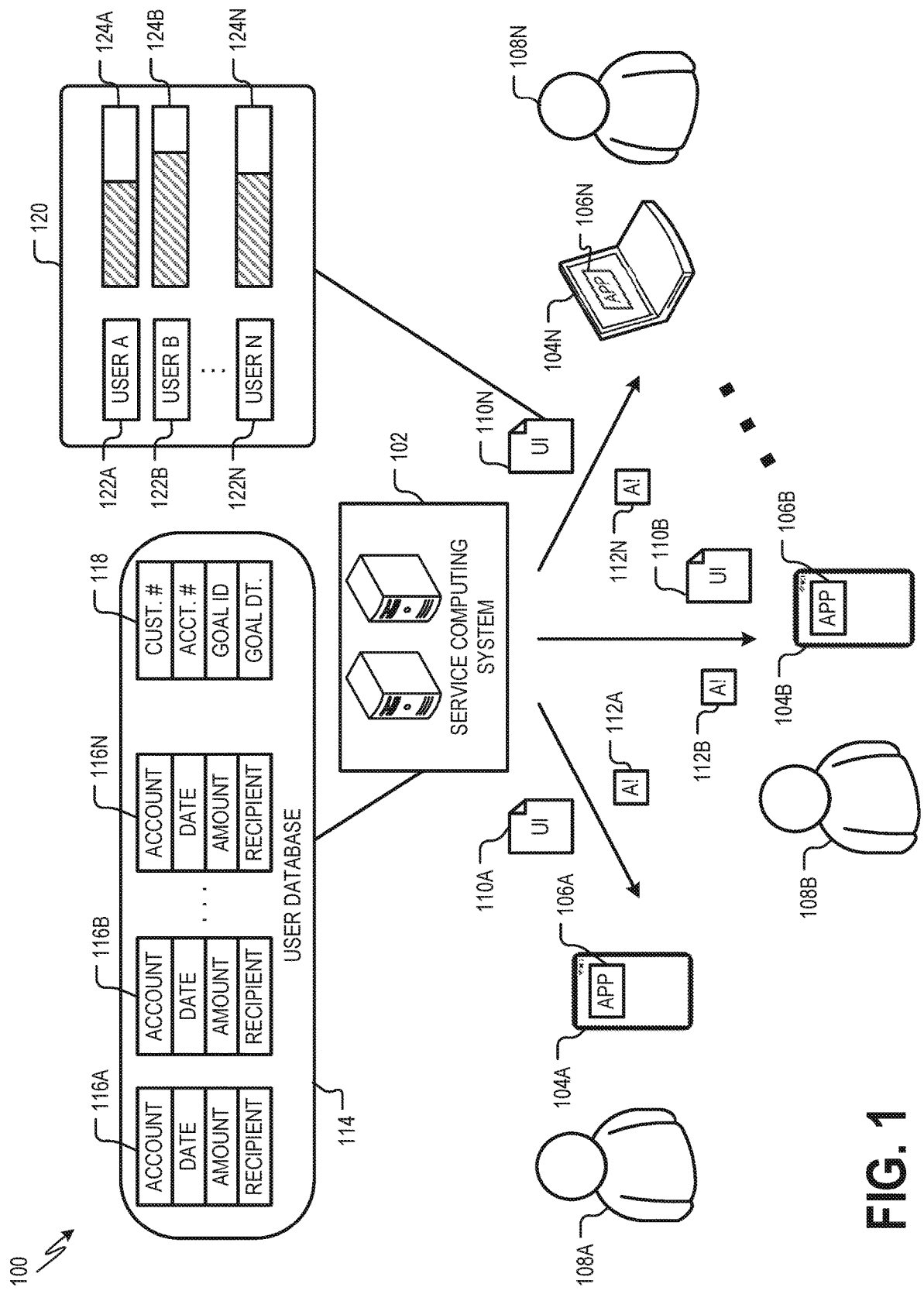
FIG. 1 is a diagram showing one example of an environment for interfacing with multiple human users.

Various examples are directed to systems and methods for interfacing a computing device or system of computing devices to multiple human users. A computing system is in communication with multiple user computing devices, with each user computing device associated with at least one user. The computing system manages a financial goal that is shared among the users. The computing system accesses account data describing accounts of each of the users and determines how much each user has allocated to the shared goal. The computing system generates a user interface that is provided to some or all of the users. The user interface indicates each user's progress towards the shared financial goal.

Family, friends, business partners, and others can have a shared financial goal. For example, a group of friends may wish to take a trip together. A family may save for a child's schooling expense. Potential business partners may save capital for starting or maintaining a business. Computing systems can be used to track and execute various aspects of financial goals. For example, a financial institution computing system or similar computing system may allow a user to make deposits towards a goal, monitor account balances, and track goal-related expenses, among other features.

Additional challenges are created, however, when multiple users (e.g., with different accounts) are part of a shared financial goal. When multiple users participate in a shared financial goal, it is desirable for some or all of the users to monitor the progress of some or all of the other users. Some users, however, are hesitant to provide other participants in the shared financial goal with access to sensitive financial information. Shared financial goal participants, in some examples, could create a joint account and make goal-related allocations to the joint account. This, however, increases overhead hassle for the users.

To address these and other issues, various examples described herein are directed to a service computing system that monitors the progress of multiple users participating in a shared financial goal. The service computing system provides some or all the users with a user interface that provides to the users an indication of each users' progress towards the shared financial goal. In this way, users may not need to access other users' private financial information to monitor the progress of other users towards the shared financial goal. At the same time, as described herein, the service computing system may have access to one or more user accounts that the users may use, in conjunction with the service computing system, to settle their respective portions of the financial goal expenses.

In some examples, the service computing system is also configured to facilitate adding users to the shared financial goal. For example, users are often in physical proximity to one another when planning or otherwise discussing a shared financial goal. The service computing system may be programmed to query a first user computing device associated with a first user. In response, the first user computing device attempts to contact other user computing devices near the first user computing device via a short-range communication medium. The first user computing device and/or the service computing system matches user computing devices that respond via the short-range communication medium to other users (e.g., via an address book of the first user). The first user is then provided with a goal participant suggestion message indicating an option to invite some or all of the corresponding users to the financial goal.

The service computing system, in some examples, is also programmed to provide alert messages to some or all of the user computing devices that are associated with users participating in a shared financial goal. For example, if one or more users' allocations to the shared financial goal fail to meet a target allocation, the service computing system sends an alert message indicating that.

FIG. 1 is a diagram showing one example of an environment 100 for interfacing with multiple human users 108A, 108B, 108N. The environment 100 includes a service computing system 102. The service computing system 102 performs various operations described herein such as, for example, adding users to a shared financial goal, adding expenses to a shared financial goal, monitoring progress towards a shared financial goal and/or generating the user interface (UI) 110A, 110B, 110N.

The service computing system provides the UI 110A, 110B, 110N to user computing devices 104A, 104B, 104N. User computing devices 104A, 104B, 104N provide the UI 110A, 110B, 110N to the respective users 108A, 108B, 108N. The user computing devices 104A, 104B, 104N may be or include any suitable computing device or devices such as, for example, a smart phone, a tablet computer, a laptop computer, a smart watch, etc. User computing devices 104A, 104B comprise input/output (I/O) devices for providing the UI 110A, 110B, 110N to the users 108A, 108B, 108N. For example, user computing devices 104A, 104B comprise a display for showing the UI 110A, 110B, 110N to users 108A, 108B, 108N. In some examples, a user computing device 104A, 104B, 104N is or includes a virtual assistant computing device, such as a Google Home device available from Google, Inc., an Amazon Echo device available from Amazon.com, Inc., etc.

In some examples, user computing devices 104A, 104B execute an application 106A, 106B, 106N that facilitates the provision of the UI 110A, 110B, 110N. In some examples, the application 106A, 106B, 106N is a web browser that communicates with the service computing system 102 (e.g., a web server thereof) to receive and display the UI 110A, 110B, 110N. For example, the UI 110A, 110B, 110N may be or include a web page displayed at the user computing device 104A, 104B via the web browser. Also, in some examples, the application 106A, 106B, 106N is an application that otherwise communicates with the web server 106 and/or service computing system 102. For example, the application 106A, 106B, 106N may be or include a mobile or other application that includes an embedded web view or other view that receives a web document from the service computing system 102. Although three users 108A, 108B, 108N and three user computing devices 104A, 104B are shown in FIG. 1, any suitable number of users 108A, 108B, 108N and associated user computing devices 104A, 104B, 104N may be present.

The environment 100 also includes a service computing system 102. The service computing system 102 includes one or more computing devices that may be at a common geographic location or may be distributed across multiple geographic locations. The service computing system 102 executes various operations associated with managing a shared financial goal including, for example, preparing and serving the UI 110A, 110B, 110N. For example, the service computing system maintains a user database 114 with data regarding funds allocated to the shared financial goal by the various users 108A, 108B, 108N. The user database 114 includes a goal table 118. Records in the goal table 118 indicate one or more goals associated with a particular user 108A, 108B, 108N. The user database 114 may also include one or more account tables 116A, 116B, 116N. An account table 116A, 116B, 116N includes deposit and/or withdrawal transaction records, as described herein.

The service computing system 102 may begin processing a shared financial goal in various different ways. In some examples, a user 108A, 108B, 108N initiates a shared financial goal by providing shared financial goal data to the service computing system 102 (for example, by entering text or other data via the UI 110A, 110B, 110N). Also, in some examples, the service computing system identifies a potential shared financial goal (considering, for example, captured conversation from one or more users 108A, 108B, 108N, past financial transactions from one or more users 108A, 108B, 108N, etc.).

When a shared financial transaction is initiated, the service computing system 102 adds users 108A, 108B, 108N and/or goal expenses to the shared financial goal. In some examples, the service computing system 102 suggests other users 108A, 108B, 108N to participate in the shared financial goal. For example, the service computing system 102 may access previous goal data describing one or more previous shared financial goals in which the currently participating user or users 108A, 108B, 108N participated. Users 108A, 108B, 108N who have previously participated in shared financial goals with the currently participating user or users 108A, 108B, 108N may be identified as potential participants. Also, in another example, the user computing device 104A, 104B, 104N of the currently participating user or users 108A, 108B, 108N queries for other user computing devices 104A, 104B, 104N that are reachable via a short-range communications medium. The user computing device 104A, 104B, 104N and/or service computing system 102 identifies users 108A, 108B, 108N associated with user computing devices 104A, 104B, 104N that reply to the query. Users 108A, 108B, 108N associated with user computing devices 104A, 104B, 104N that reply to the query may be identified as potential participants.

The service computing system 102 may also add goal expenses to the shared financial goal, for example, as described herein. Goal expenses are expenses associated with a shared financial goal that fulfill all or part of the goal. Consider an example in which the shared financial goal is a group vacation. Goal expenses may include airfare, food, lodging, etc. for the vacation. Consider another example in which the shared financial goal is to raise capital for a partnership or other business venture. Goal expenses may include the desired amount of capital. Consider yet another example in which the shared financial goal is to meet health or other care expenses for a loved one. Goal expenses may include the cost of the care and other expenses associated with the care (travel for the patient and/or caretaker, etc.).

The service computing system 102 also monitors the progress of the participating users 108A, 108B, 108N towards the goal. When a user 108A, 108B, 108N joins the shared financial goal, the user 108A, 108B, 108N may provide the service computing system 102 with credentials to access an account table 116A, 116B, 116N describing at least one account of the user 108A, 108B, 108N that will be used to fund all or part of the user's portion of the shared financial goal. In some examples and for some users 108A, 108B, 108N, the service computing system 102 is associated with a financial institution that holds the account that the user utilizes for the financial goal. In this example, the service computing system 102 may manage a service account table 116A, 116B, 116N associated with that account. In other examples, the service computing system 102 is not associated with the financial institution that holds the accounts used by one or more of the users 108A, 108B, 108N to fund the shared financial goal. In these examples, the service computing system 102 may not be associated with a financial institution and/or one or more of the users 108A, 108B, 108N may bank at a different financial institution. In these examples, the user 108A, 108B, 108N provides the service computing system 102 with credentials to access account information, such as an account table 116A, 116B, 116N at a financial institution not associated with the service computing system 102.

To monitor the progress of the users 108A, 108B, 108N towards the shared financial goal, the service computing system 102 determines an amount allocated by each user 108A, 108B, 108N towards the shared financial goal. This may be performed periodically (e.g., every day, every hour, every week, etc.). For a first user 108A, the service computing system 102 accesses an account table 116A corresponding to that user. For example, the service computing system 102 finds or retrieves an account balance from the account table 116A. In some examples, the service computing system 102 also retrieves from the account table 116A a customer identifier. For example, the service computing system 102 may utilize an account identifier to access the appropriate account table 116A. From the account table 116A, the service computing system 102 may retrieve a customer identifier describing the user 108A. In some examples, the service computing system 102 uses the account number and the customer identifier as a compound key to retrieve a goal record corresponding to the user 108A from the goal table. The goal record may indicate, for example, a goal identifier that indicates the shared financial goal as well as goal description data. The goal description data describes how funds at the user's account are allocated to the shared financial goal. For example, the goal description data may indicate an amount allocated and/or rules for allocating from the account (e.g., X % of the account, Y dollars per month, etc.). The service computing system 102 monitors the other users 108A, 108B, 108N in a similar manner.

When the service computing system 102 has determined the amount allocated towards the shared financial goal by the users 108A, 108B, 108N, the service computing device 102 generates and/or updates the UI 110A, 110B, 110N. FIG. 1 shows an example screen 120 that may be presented in the UI 110A, 110B, 110N to show the progress of the users 108A, 108B, 108N towards the shared financial goal. The screen 120 includes user indicators 122A, 122B, 122N and associated user shapes 124A, 124B, 124N. In the example of FIG. 1, user indicator 122A and user shape 124A correspond to the user 108A. User indicator 122B and user shape 124B correspond to user 108B. User indicator 122N and user shape 124N correspond to user 108N.

User shapes 124A, 124B, 124N have complete portions and incomplete portions. The ratio of the complete portion to the incomplete portion shows the respective users' progress towards the shared financial goal. In the example of FIG. 1, the complete portions are indicated by the cross-hatched portions of the user shapes 124A, 124B, 124N, and the incomplete portions are indicated by the remainders of the user shapes 124A, 124B, 124N. For example, as users 108A, 108B, 108N allocate more funds towards the shared financial goal, the complete portions of the user shapes 124A, 124B, 124N become relatively larger while the incomplete portions of the user shapes 124A, 124B, 124N become relatively smaller.

If one or more users 108A, 108B, 108N have not reached a target level of funds allocated to the shared financial goal (a target allocation), the service computing system 102 is programmed to send alert messages 112A, 112B, 112N to one or more of the users 108A, 108B, 108N. In some examples, an alert message 112A, 112B, 112N is or includes a pop-up or other window positioned on top of another screen of the UI 110A, 110B, 110N, such as the screen 120. In some examples, the alert message 112A, 112B, 112N is or includes an e-mail, short message service (SMS) message, or other suitable message.

Figure 2:
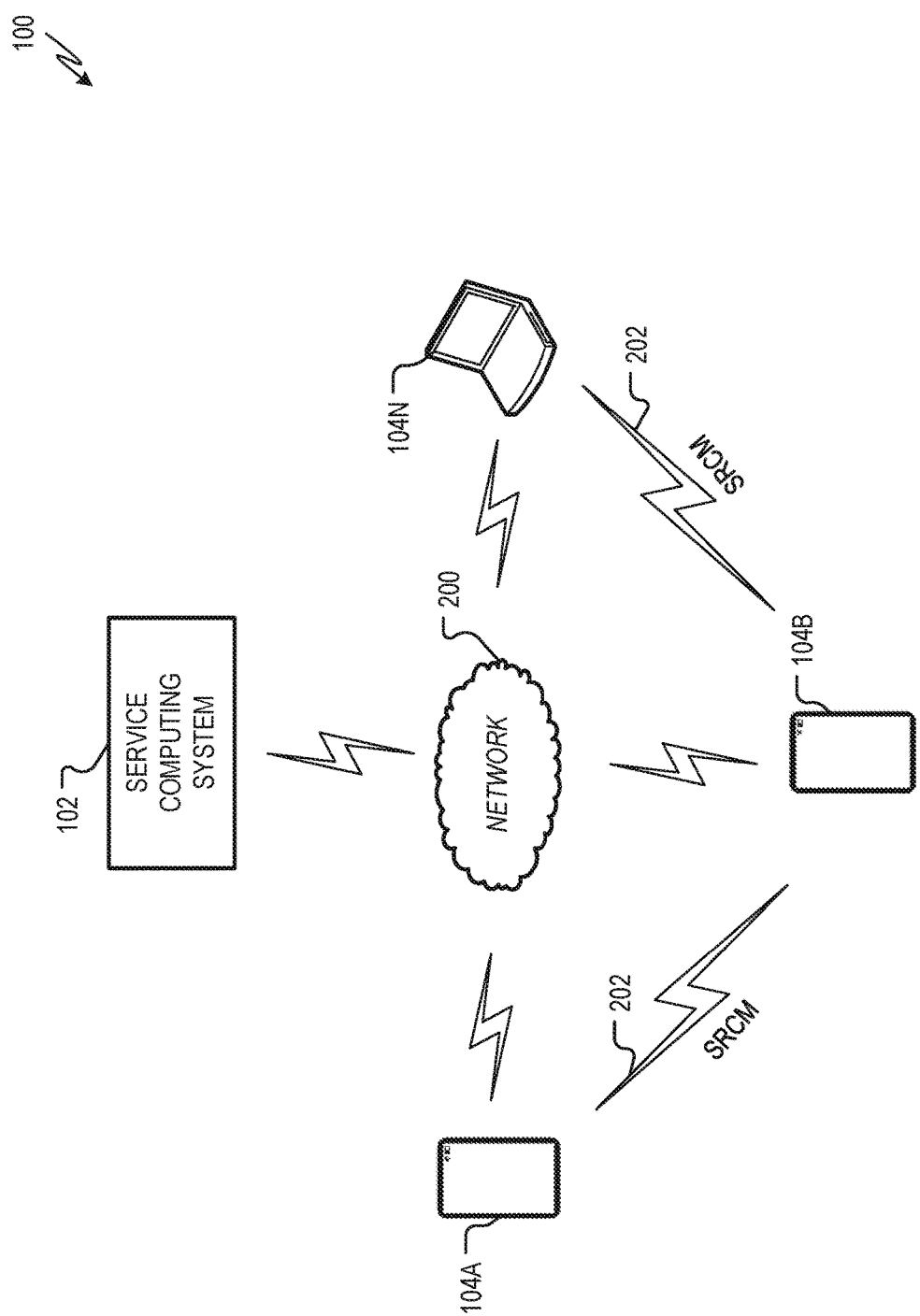
FIG. 2 is a diagram showing another example of the environment including additional details.

FIG. 2 is a diagram showing another example of the environment 100 including additional details. In the example of FIG. 2, the user computing devices 104A, 104B, 104N and the service computing system 102 are in communication with one another via a network 200. The network 200 may be or comprise any suitable network element operated according to any suitable network protocol. For example, one or more portions of the network 200 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a Wi-Fi network, a WiMax network, another type of network, or a combination of two or more such networks, etc.

As shown in the example of FIG. 2, some or all of the user computing devices are in communication with one another via a short range communication medium 202. The short range communication medium 202 is a wireless medium that enables communication between devices that are near to one another (e.g., devices within about 10 meters of one another, devices with a line-of-sight path there between, etc.) For example, the short range communication medium 202 may include an infrared connection, near field communication (NFC), Bluetooth®, Bluetooth LE™, an infrared connection, etc.

Figure 3:
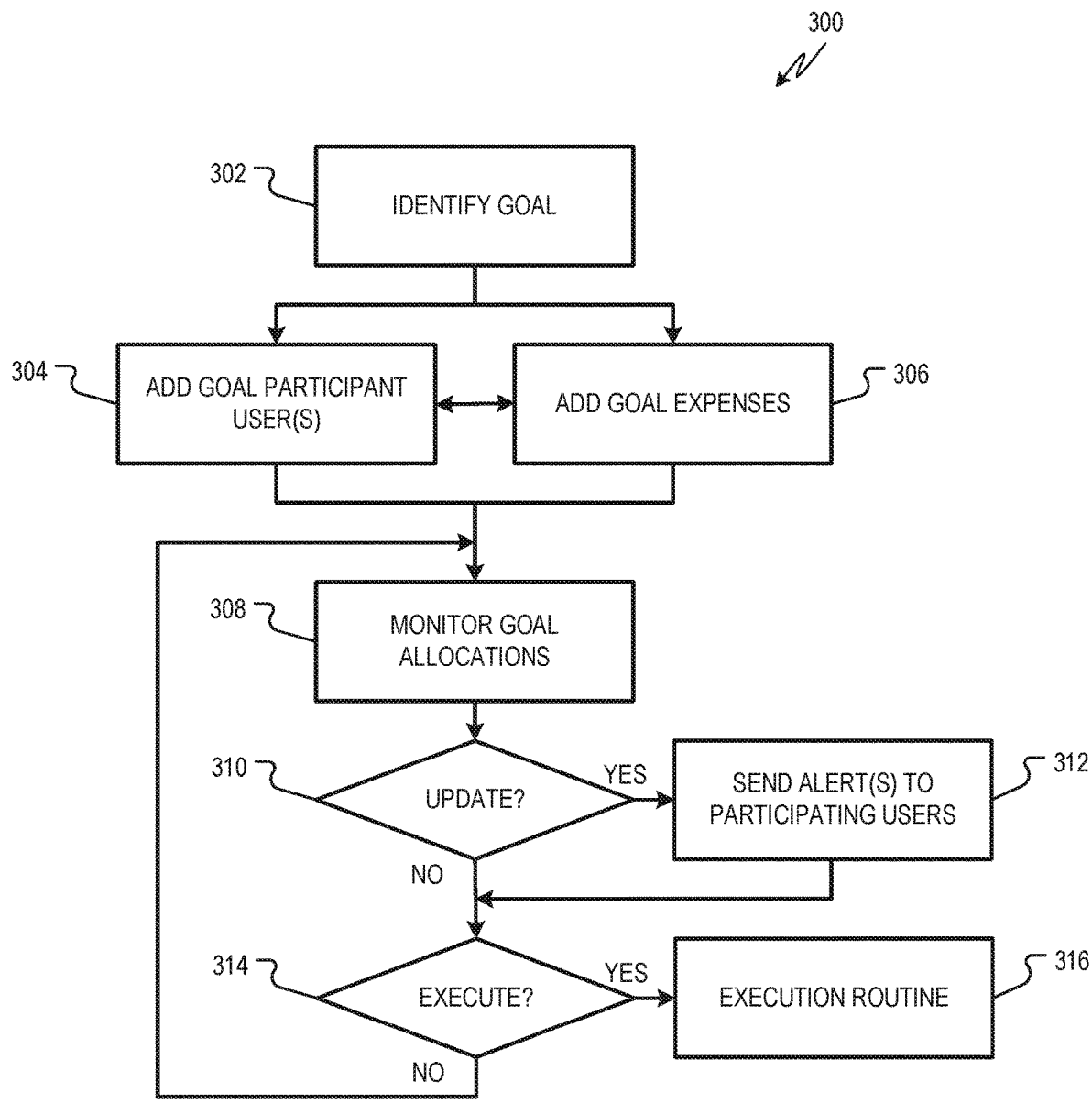
FIG. 3 is a flowchart showing one example of a process flow that may be executed by the service computing system of FIG. 1 to interface with multiple human users to manage a shared financial goal.

FIG. 3 is a flowchart showing one example of a process flow 300 that may be executed by the service computing system 102 to interface with multiple human users to manage a shared financial goal. At operation 302, the service computing system identifies a financial goal shared among multiple users. The financial goal may be identified based on a prompt received from an initiating user 108A, 108B, 108N and/or may be generated by the service computing system 102 and/or user computing devices 104A, 104B, 104N.

In some examples, a user 108A, 108B, 108N identifies a shared financial goal. For example, a user 108A, 108B, 108N, via the UI 110A, 110B, 110N, requests that the service computing system 102 manage a shared financial goal identified by the user 108A, 108B, 108N. The initiating user 108A, 108B, 108N identifies the shared financial goal. For example, the initiating user 108A, 108B, 108N identifies one or more goal expenses and, in some examples, identifies one or more other users 108A, 108B, 108N to potentially participate in the shared financial goal.

In other examples, the service computing system 102 and/or user computing devices 104A, 104B, 104N suggests a shared financial goal to one or more of the users 108A, 108B, 108N. For example, the service computing system 102 may analyze data regarding one or more of the users 108A, 108B 108N such as, for example, previous spending, etc. For example, if a user 108A, 108B, 108N takes a vacation every year, the service computing system 102 may prompt the user to create a shared financial goal to take a vacation similar to or different than previous vacations. Also, for example, if a user 108A, 108B, 108N has made a purchase that indicates a potential shared financial goal, the service computing system 102 may prompt the user 108A, 108B, 108N to indicate whether it should manage a shared financial goal. For example, if a user 108A, 108B, 108N orders airline tickets for multiple people, the service computing system 102 may query the user 108A, 108B, 108N to ask if the purchase indicates a shared financial goal that the service computing system 102 can manage.

In some examples, the service computing system 102 monitors conversations of one or more users 108A, 108B, 108N to detect potential shared financial goals. For example, a user computing device 104A, 104B, 104N may comprise a microphone or other audio sensor for recording sounds around the device. The user computing device 104A, 104B, 104N records spoken words of the user indicating a potential shared financial goal. The words may be a direct command (e.g., "computer, please investigate a trip with my friends") or indirect. For example, the service computing system 102 and/or user computing device 104A, 104B, 104N determines that words spoken by a user 108A, 108B, 108N indicate a potential shared financial goal. In response, the service computing device 102 and/or user computing device 104A, 104B, 104N queries the user 108A, 108B, 108N to ask whether the user 108A, 108B, 108N would like to initiate a shared financial goal. Consider an example in which a user 108A, 108B, 108N is discussing purchasing school supplies for the user's son (who may also be a user 108A, 108B, 108N). The user computing device 104A, 104B, 104N prompts the user 108A, 108B, 108N to begin a shared financial goal to purchase the discussed school supplies, where participants in the shared financial goal may include the user 108A, 108B, 108N and the user's son.

At operation 304, the service computing device 102 and/or user computing devices 104A, 104B, 104N may add one or more participant users to the shared financial goal. In some examples, a user 108A, 108B, 108N who is already participating in the shared financial goal provides data suggesting one or more potential goal participants. Also, in some examples, the service computing system 102 and/or user computing devices 104A, 104B, 104N suggest one or more potential goal participants. For example, the service computing system 102 and/or user computing device 104A, 104B, 104N identifies users who have previously participated in a shared financial goal with the user or users 108A, 108B, 108N who are already participating in the goal.

In some examples, the service computing system 102 selects potential goal participants by detecting one or more users 108A, 108B, 108N who are in physical proximity to a user computing device 104A, 104B, 104N. For example, a user computing device 104A, 104B, 104N of a user 108A, 108B, 108N that is already participating in the shared goal may utilize a short range communication medium to identify other user computing devices 104A, 104B, 104N that are nearby and suggest associated users 108A, 108B, 108N as potential goal participants.

In some examples, user computing device 104A and/or service computing system 102 filters users 108A, 108B, 108N identified as potential participants in a shared financial goal. The computing device 104A and/or service computing system 102 may filter users 108A, 108B, 108N based on various criteria such as, for example, a type of shared financial goal in which the potential participants previously participated with the currently participating user or users 108A, 108B, 108N, whether the potential participant appears in an address book or other contact list of the currently participating user or users 108A, 108B, 108N, etc. Also, in some examples, potential participants are approved by some or all of the users 108A, 108B, 108N who are already participating in the shared financial goal.

When a set of potential participants is determined, the service computing system 102 sends a goal invitation message to the potential participants (e.g., via user computing devices 104A, 104B, 104N associated with the potential participants). If a potential participant wants to participate in the shared financial goal, he or she sends a reply message. The reply message may indicate, for example, data describing an account from which the potential participant will allocate funds to the shared financial goal. The data may include, for example, an account number, a financial institution where the account is held, etc.

At operation 306, the service computing system 102 and/or user computing devices 104A, 104B, 104N add goal expenses to the shared financial goal. For example, the service computing system 102 may store goal expense data describing goal expenses that have been added to the shared financial goal. In some examples, goal expenses are added to a shared financial goal by a currently participating user or users 108A, 108B, 108N. For example, a user 108A, 108B, 108N may propose a potential goal expense by entering data regarding the potential goal expense via the UI 110A, 110B, 110N. Also, in some examples, the service computing system 102 selects a potential goal expense.

The service computing system 102 sends a proposed goal message to other users 108A, 108B, 108N participating in the shared financial goal. In some examples, the users 108A, 108B, 108N decide whether to accept the proposed goal expense. For example, a user or subset of participating users 108A, 108B, 108N may determine whether to accept or reject the proposed expense. In some examples, all users 108A, 108B, 108N participating in a shared financial goal vote on whether to include an expense in the goal.

In some examples, less than all of the users 108A, 108B, 108N participating in a shared financial goal approve a potential goal expense. In this case, the goal expense may be rejected and/or partially accepted. When a goal expense is partially accepted, only a subset of the participating users 108A, 108B, 108N contribute to the goal expense. For example, if the shared financial goal is a vacation, one or more users may propose a side trip as a goal expense. If all of the other goal participant users 108A, 108B, 108N do not agree, the side trip may be added as a goal expense for the goal participant users 108A, 108B, 108N who want it and not for other goal participant users 108A, 108B, 108N.

In the process flow 300, operations 304 and 306 are shown in parallel. For example, the service computing system 102 may add goal participants and goal expenses concurrently and/or in any particular order. In some examples, service computing system 102 moves from adding a goal participant to adding a goal expense (and back). For example, the service computing system 102 may add one or more participating users 108A, 108B, 108N at operation 304. Then, one of the participating users 108A, 108B, 108N proposes a goal expense at operation 306. Subsequently, an additional user 108A, 108B, 108N is added again at operation 304. In some examples, new users and/or goal expenses may still be added until the shared financial goal is fully executed.

At operation 308, the service computing system 102 monitors the goal allocations of the users 108A, 108B, 108N. For example, the service computing system 102 may access appropriate account 116A, 116B, 116N and/or goal tables 118 to monitor the amounts that the users 108A, 108B, 108N have allocated to the shared financial goal. In some examples, the allocations of each participating user 108A, 108B, 108N are checked. Monitoring goal allocations, in some examples, also includes updating the UI 110A, 110B, 110N.

At operation 310, the service computing system 102 determines if any allocations by any of the users 108A,

108B, 108N have changed. If an allocation of one or more of the users 108A, 108B, 108N has changed, the service computing system may send an alert message 112A, 112B, 112N to one or more of the users 108A, 108B, 108N at operation 312. The alert message 112A, 112B, 112N, in this example, indicates that there has been a change to user allocations. For example, one or more of the users 108A, 108B, 108N may respond to the alert message 112A, 112B, 112N by viewing the UI 110A, 110B, 110N to see the changed allocations. In some examples, the service computing system 102 also determines whether any of the users has fallen behind a target allocation. An alert message 112A, 112B, 112N may be sent if a user has fallen behind the user's target allocation for the shared financial goal.

At operation 314, the service computing system 102 determines if it is time to execute all or part of the shared financial goal. For example, the users 108A, 108B, 108N may specify a date of the shared financial goal (a scheduled time for a trip, a time at which capital for a business is needed, etc.). In some examples, different expenses of the shared financial goal are executed at different times. For example, when the shared financial goal is a trip, airfare and lodging may be due in full or in part prior to the trip while meals may be settled during or after the trip. If it is time to execute all or part of the shared financial goal, the service computing system 102 executes an execution routine at 316. If it is not time to execute some or all of the shared financial goal, the service computing system 102 may again monitor the users' allocations to the shared financial goal at operation 308.

The target allocation for a user 108A, 108B, 108N describes the amount that the user 108A, 108B, 108N should have allocated to the shared financial goal at any given time. If a user 108A, 108B, 108N falls behind his or her target allocation, the service computing system 102 sends an alert message 112A, 112B, 112N as described herein.

Figure 4:
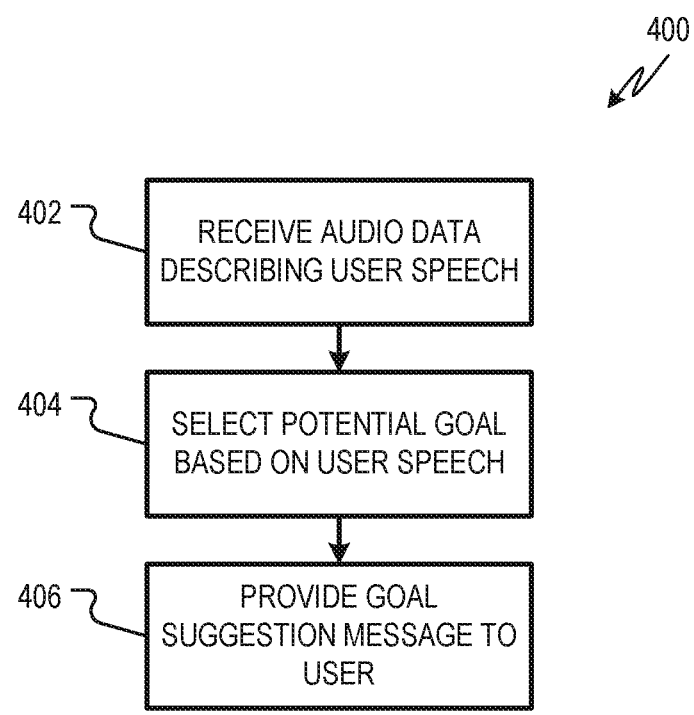
FIG. 4 is a flowchart showing one example of a process flow that may be executed by the service computing system of FIG. 1 to generate a shared financial goal suggestion based on user data.

FIG. 4 is a flowchart showing one example of a process flow 400 that may be executed by the service computing system 102, for example, to generate a shared financial goal suggestion based on user data. For example, the process flow 400 may be all or part of the way that the service computing system 102 may execute the operation 302 of the process flow 300.

At operation 402, the service computing system 102 receives audio data describing the speech of one or more users 108A, 108B, 108N. For example, the audio data may have been captured by a microphone or other audio sensor of a user computing device 104A, 104B, 104N. The user computing device 104A, 104B, 104N and/or service computing system 102 performs voice recognition, voice-to-text, and/or other suitable processing on a raw signal from a microphone or audio sensor. For example, the audio data may include a transcript of words spoken and, in some examples, an indication of the speaker or speakers.

At operation 404, the service computing system 102 selects a potential goal based on user speech indicated by the audio data. The user speech may describe a potential financial goal. For example, the user speech may include a discussion regarding saving for a child's education. The user speech may include a discussion of a trip that the user would like to take, etc. At operation 406, the service computing device 102 sends a goal suggestion message to one or more users. The goal suggestion message includes a description of the suggested goal and a prompt for the user or users 108A, 108B, 108N to initiate a shared financial goal according to the goal suggestion message. If the user or users 108A, 108B, 108N indicate that the shared financial goal is to be initiated, the service computing system 102 may proceed, for example, with operations 304 and 306 of the process flow 300. In various examples, some or all of the operations described with respect to FIG. 4 as being performed by the service computing system 102 may be performed in whole or in part by one or more user computing devices 104A, 104B, 104N.

Figure 5:
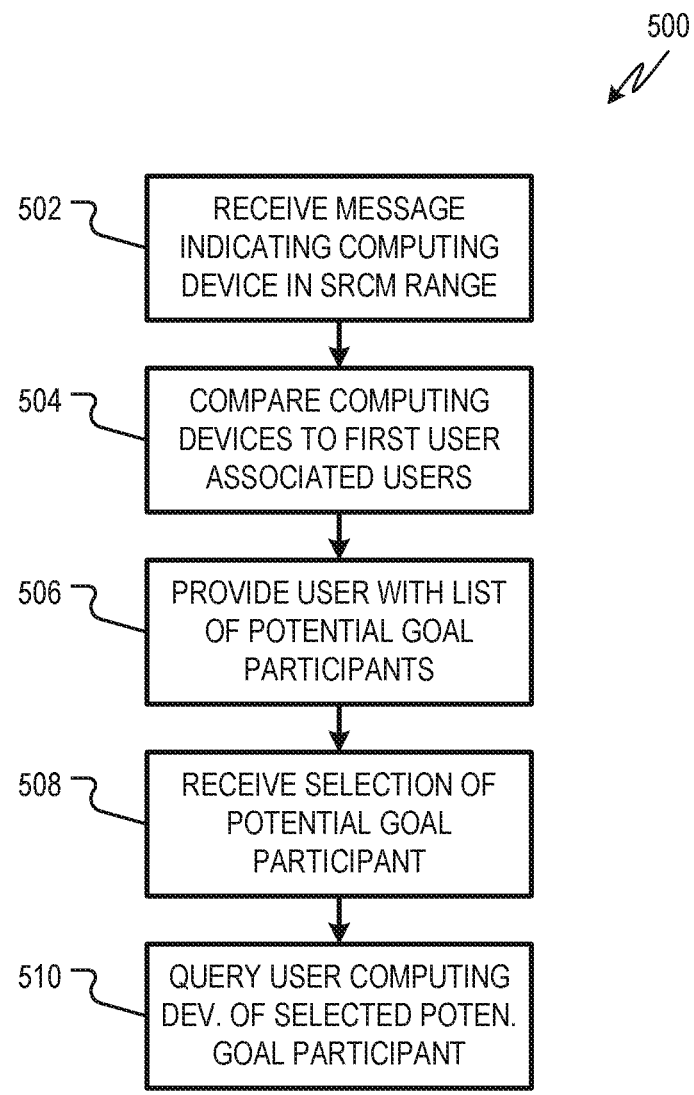
FIG. 5 is a flowchart showing one example of a process flow that may be executed by the service computing system of FIG. 1 to identify users who are potential participants in a shared goal using a short range communication medium.

FIG. 5 is a flowchart showing one example of a process flow 500 that may be executed by the service computing system 102 to identify users who are potential participants in a shared goal using a short range communication medium. The process flow 500 shows one example way that the service computing device 102 can perform operation 304 of the process flow 300. Users 108A, 108B, 108N who are interested in participating in a shared financial goal are sometimes in close proximity to one another (e.g., gathered at a friend's house, gathered at a restaurant, etc.). In some examples, one or more users 108A, 108B 108N may trigger the process flow 500 when the one or more users 108A, 108B, 108N are physically near other users who are potential shared financial goal participants.

At operation 502, the service computing system 102 receives a message indicating one or more computing devices within short-range communication medium range of a first user computing device 104A. For example, a first user computing device 104A may be programmed to initiate a short range communication medium connection with one or more other user computing devices 104B, 104N in range. If the first user computing device 104A is successful in making one or more short-range communication medium connections, it sends a message that is received by the service computing system 102 at operation 502. The message indicates the user computing device or devices with which the user computing device 104A was able to successfully connect using the short range communication medium, which may be referred to as short-range computing devices.

At operation 504, the service computing system 102 compares the short range computing devices indicated by the message of operation 502 to a list of user computing devices 104B, 104N and/or users 108A, 108B, 108N associated with the first user computing device 104A. For example, the service computing system 102 compares the short range user computing devices to a contact list, address book, or other data describing people (e.g., users 108B, 108N) with whom the user 108A has a relationship. In some examples, the service computing system 102 compares the short range computing devices to a set of computing devices associated with users 108B, 108N with whom the user 108A has previously participated in a shared financial goal.

At operation 506, the service computing device provides the first user 108A with a potential participant message indicating potential participants in the shared financial goal, where the message indicates users who were successfully matched to associated users at operation 504. The first user 108A may select one or more of the potential participants from the message and provide a reply indicating the users who should be invited to participate in the shared financial goal. At operation 508, the service computing device receives a selection of one or more potential goal participant users from those indicated to the first user 108A at operation 504. At operation 510, the service computing device queries the user computing device or devices 104B, 104N of one or more potential goal participant users 108B, 108N indicated at operation 508. The query asks whether the users 108B, 108N desire to participate in the shared financial goal. Users 108B, 108N who do want to participate may respond by providing an account and other suitable data as described herein.

Figure 6:
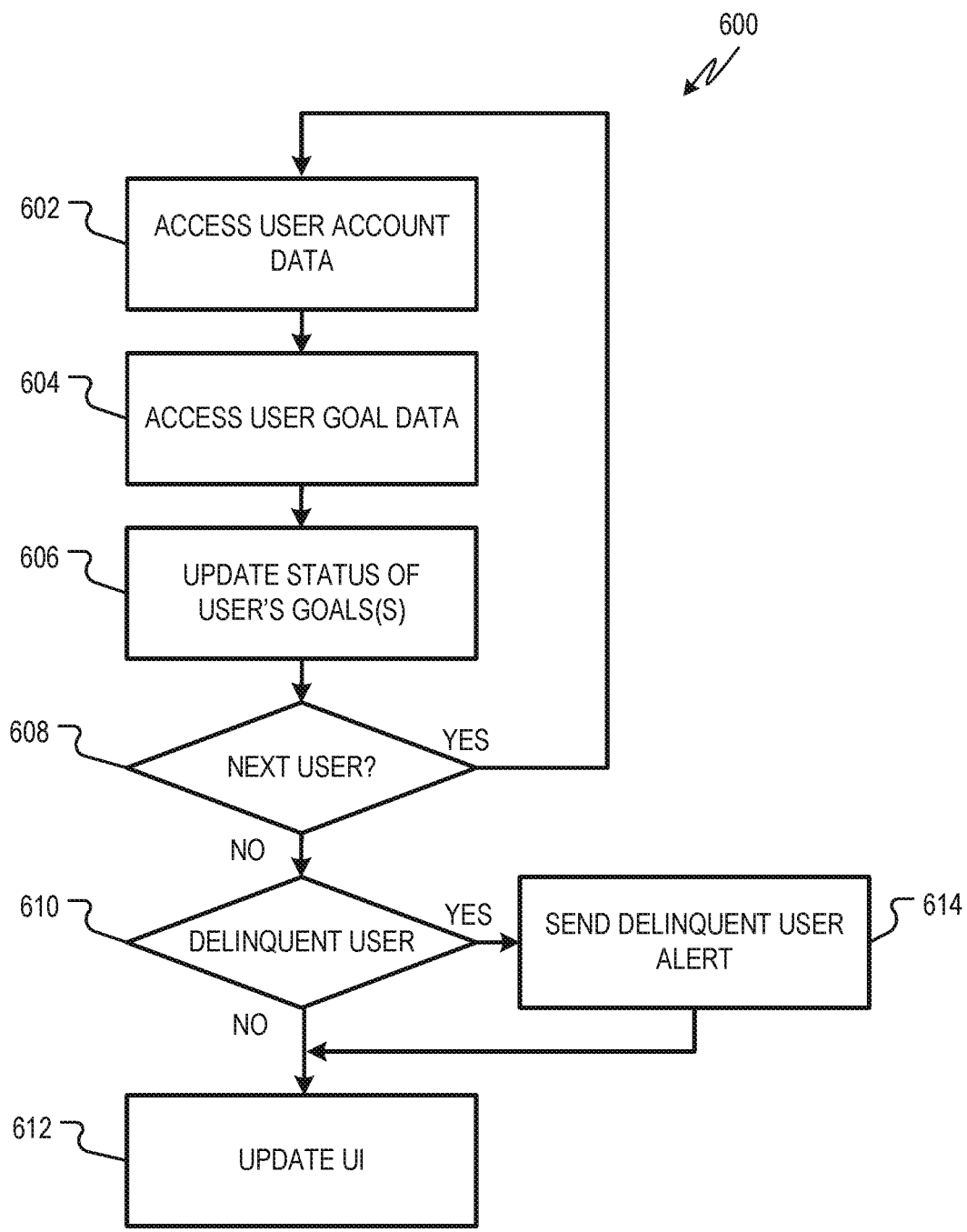
FIG. 6 is a flowchart showing one example of a process flow that may be executed by the service computing system of FIG. 1 to monitor user allocations to a shared financial goal.

FIG. 6 is a flowchart showing one example of a process flow 600 that may be executed by the service computing system 102 to monitor user allocations to a shared financial goal. For example, the process flow 600 shows one example way that the service computing system 102 may execute all or part of the operation 308 of the process flow 300.

At operation 602, the service computing system 102 accesses user account data for a first user 108A. This may include, for example, querying an account table 116A, 116B, 116N and/or records thereof. The account data indicates a balance of one or more accounts of the user 108A and may also indicate other identifying information about the user 108A such as, for example, a customer number. At operation 604, the service computing system 102 uses at least a portion of the account data to access goal data for the user 108A. For example, the service computing system 102 may access the goal table 118 to retrieve a goal record or records associated with the user 108A. The goal table 118, in some examples, is accessed using a compound key. For example, the service computing system 102 may access the goal record or records associated with the user 108A using an account number and/or a customer identifier included in the account data.

The goal data indicates one or more goals in which the user 108A is participating. The goal data may also indicate an amount that the user 108A has allocated to the goal (or to each goal if the user 108A is participating in more than one goal). The user 108A may allocate money to a goal in any suitable manner. For example, the user 108A may provide an instruction that a percentage of his or her paycheck or other deposit is to be allocated to a particular goal or goals. Also, in some examples, the user 108A contacts the service computing system 102 (e.g., via the user computing device 104A and UI 110A) to make an allocation of a portion of the balance of the user's account to a goal. Money from an account that is allocated to a goal may remain part of the account or be transferred to another account.

In some examples, the user 108A is counted on not to spend money that has been previously allocated to a goal. Also, in some examples, the service computing system 102 is programmed to send an alert to the user 108A if the user 108A attempts to spend money from the user's account that is allocated to a goal and/or block attempted transactions that would spend money from the user's account that is allocated to a goal. In some examples, the service computing system 102 is programmed to send an alert 112A to the other participating users 108B, 108N if the user 108A spends or attempts to spend money that was previously allocated to a common shared goal.

At operation 606, the service computing system 102 updates the status of the goals in which the user 108A is participating. For example, the service computing system 102 may update aggregated goal data that shows how much has been allocated to the goal by the user 108A and other participating users 108B, 108N. At operation 608, the service computing system 102 determines if there is another participating user 108B, 108N that has not yet been considered during execution of the process flow 600. If yes, then the service computing system 102 returns to operation 602 and completes operations 602, 604, and 606 with respect to the next user 108B, 108N.

If, at operation 608, all participating users 108A, 108B, 108N have been considered, the service computing system 102 determines, at operation 610, if any of the participating users are delinquent. A participating user 108A, 108B, 108N is delinquent if the user 108A, 108B, 108N has not allocated that user's target allocation to the goal. The target allocation may be determined in any suitable manner. For example, the participating users 108A, 108B, 108N may indicate the portion of all or some of the goal expenses of the goal that are attributed to each participating user 108A, 108B, 108N. The target allocation for a user 108A, 108B, 108N is the amount that the user 108A, 108B, 108N should have allocated to the goal at any particular time to meet the user's attributed portion of the goal prior to execution. For example, the target allocation at any given time may be based on the user's allocation rate and the portion of goal expenses attributed to the user 108A, 108B, 108N. If a user 108A, 108B, 108N falls behind the user's target allocation (e.g., by more than a threshold amount), the user 108A, 108B, 108N is delinquent. Also, in some examples, the participating users 108A, 108B, 108N determine whether a user 108A, 108B, 108N has allocated sufficiently to the goal, for example, based on a vote among the participating users.

If there is a delinquent user at operation 610, the service computing system 102 sends a delinquent user alert at operation 614. The delinquent user alert, indicated by 112A, 112B, 112N in FIG. 1, indicates to the participating users 108A, 108B, 108N that one or more of the other participating users 108A, 108B, 108N is delinquent in his or her allocations to the goal. The other participating users 108A, 108B, 108N may respond to the notice, for example, by exerting peer pressure on the delinquent user and/or removing the delinquent user from the goal.

If no users are delinquent (and/or after sending the delinquent user alert), the service computing system 102 updates the UI 110A, 110B, 110N at operation 612. For example, the service computing system 102 enlarges the complete portion of one or more user shapes (such as user shapes 124A, 124B, 124N) to indicate new allocations. If a user 108A, 108B, 108N has deallocated money to the goal, the service computing system 102 may make the compete portion of one or more users shapes smaller.

Figure 7:
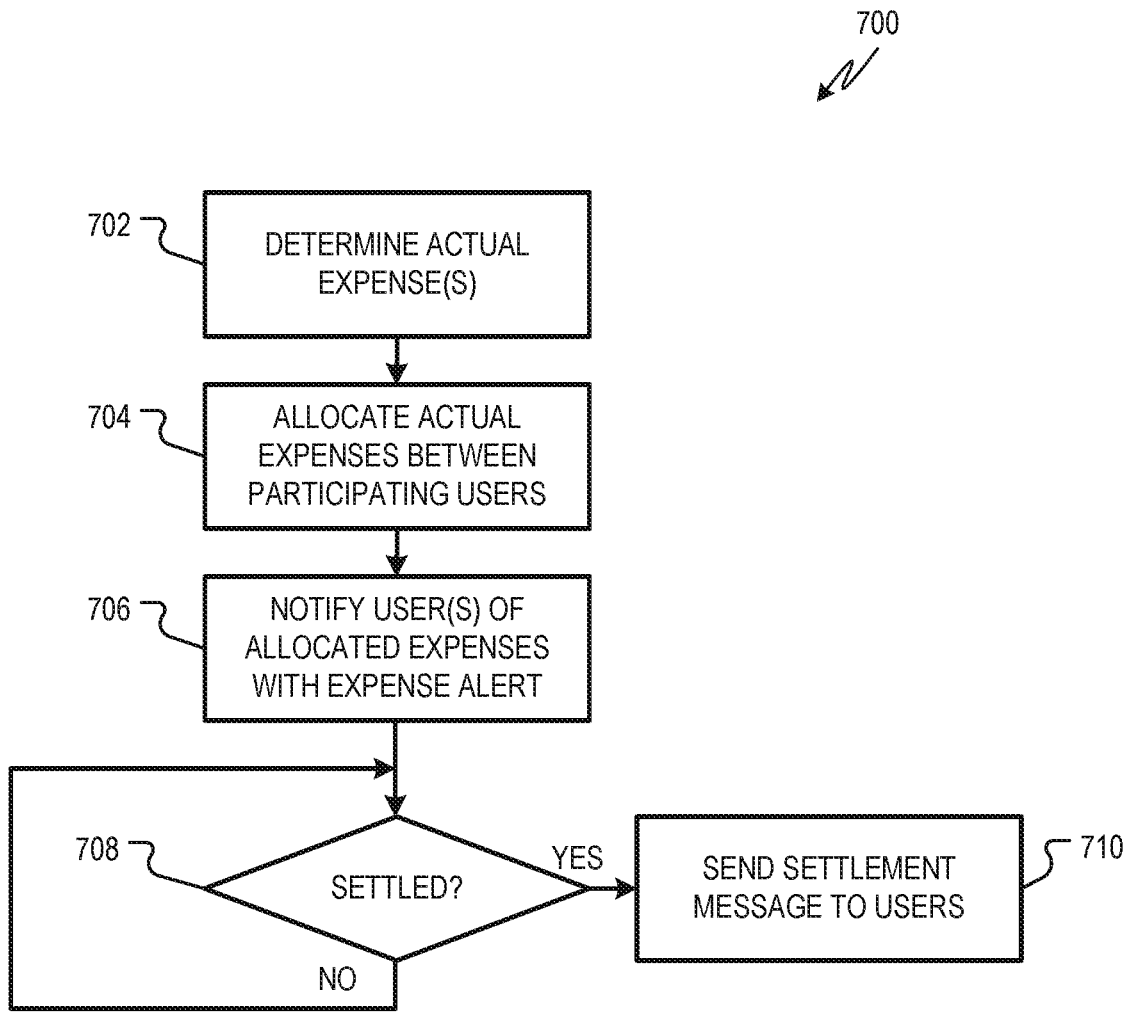
FIG. 7 is a flowchart showing one example of a process flow that may be executed by the service computing system of FIG. 1 to execute a shared financial goal.

FIG. 7 is a flowchart showing one example of a process flow 700 that may be executed by the service computing system 102 to execute a shared financial goal. For example, the process flow 700 is one example way that the service computing system 102 may execute operation 316 of the process flow 300.

At operation 702, the service computing system 102 determines the actual expenses of the goal. For example, if the goal is a vacation, the service computing system 102 may examine account tables 116A, 116B, 116N of the participating users 108A, 108B, 108N to identify expenses attributable to the goal, such as actual dining costs, actual cab fare, etc. In some examples, operation 702 is omitted. For example, some goal expenses do not change from the time they are added to the goal and, as such, actual expenses do not deviate from planned expenses.

At operation 704, the service computing system 102 allocates the actual expenses between the participating users 108A, 108B, 108N. The allocation may be performed in any suitable manner. In some examples, expenses are allocated pro rata. In some examples, different participating users 108A, 108B, 108N are allocated a different portion of the expenses. Expenses may be allocated overall or, in some examples, on a goal expense-by-goal expense basis. The participating users 108A, 108B, 108N may indicate the desired allocation of expenses when the goal is initiated and/or when particular expenses are added to the goal.

At operation 706, the service computing system 102 sends an expense alert to the participating users 108A, 108B, 108N. The expense alert indicates to each participating user 108A, 108B, 108N the amount allocated to that user 108A, 108B, 108N. The expense alert may also indicate a method that the user 108A, 108B, 108N can settle the amount allocated to him or her. For example, where one user 108A, 108B, 108N incurs a goal expense (e.g., by purchasing a plane ticket, reserving a hotel, paying for dinner, etc.), the other participating users 108A, 108B, 108N may settle the expense by paying their allocated amount to the user who incurred the expense. Also, in some examples, a participating user 108A, 108B, 108N settles his or her allocation by making a payment to a third party (e.g., product or service provider). Also, in some examples, the service computing system 102 determines whether the user allocations are sufficient to cover one or more expenses. The service computing system 102 may initiate (e.g., at the instruction of a user 108A, 108B, 108N) a transfer to settle one or more expenses.

At operation 708, the service computing system 102 determines whether all participating users 108A, 108B, 108N have settled their allocations. If not, the service computing system 102 may continue to check whether all participating users 108A, 108B, 108N have settled their allocations. In some examples, if one or more users 108A, 108B, 108N fails to settle their allocation for a threshold time, the service computing system 102 sends an alert to some or all of the users indicating the delinquency. When all participating users 108A, 108B, 108N have settled their allocations, the service computing system sends a settlement message to the users 108A, 108B, 108N at operation 710. The settlement message includes settlement completion data indicating to the participating users 108A, 108B, 108N that all users have settled their allocations.

Figure 8:
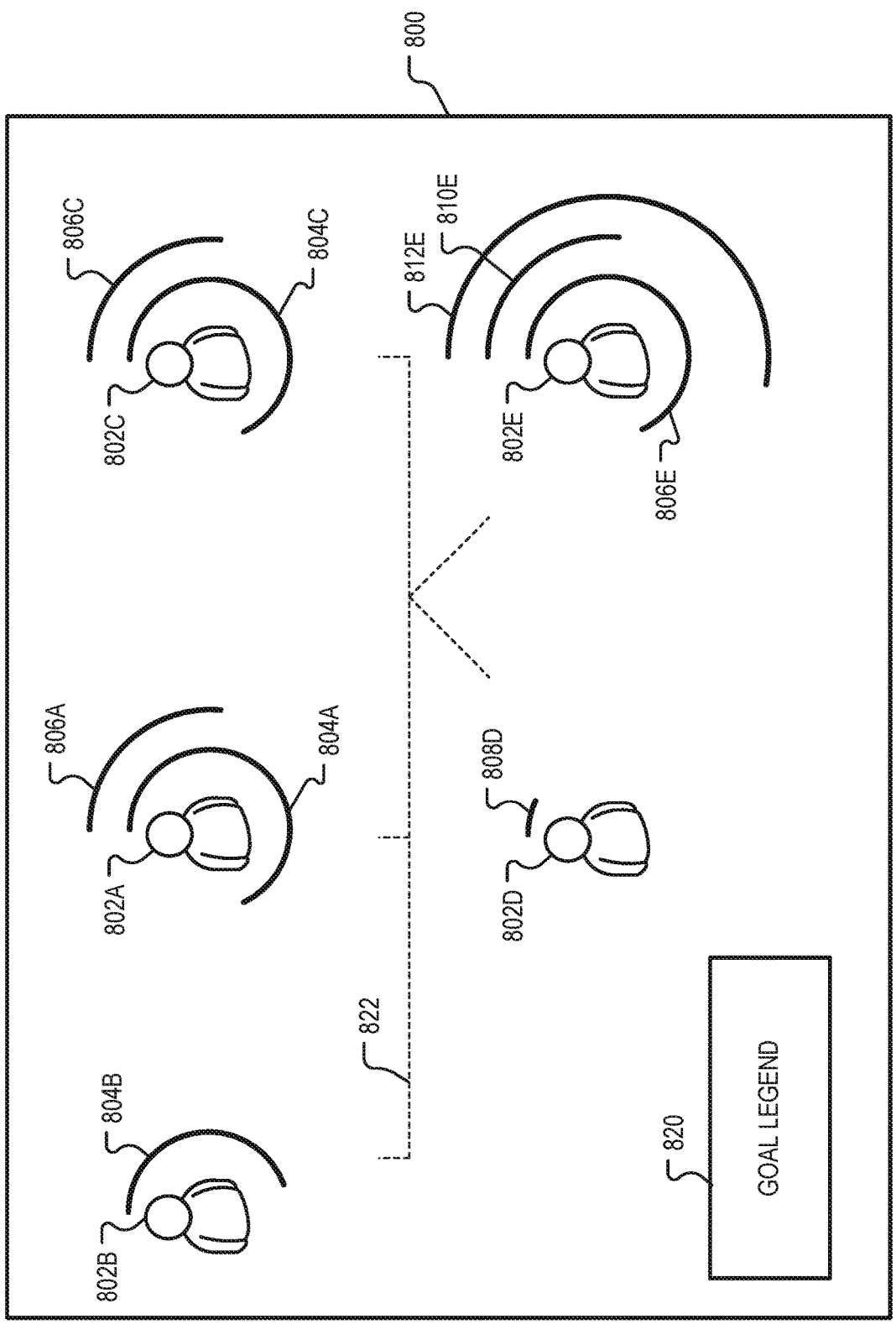
FIG. 8 is a diagram showing one example of a screen that may be provided to the participating users as part of a user interface.

FIG. 8 is a diagram showing one example of a screen 800 that may be provided to the participating users 108A, 108B, 108N as part of the UI 110A, 110B, 110N. In some examples, the screen 800 is shown to reflect multiple shared financial goals as well as relationships between participating users. In this example, the screen 800 is rendered from the perspective of a primary user indicated by user indicator 802A. For example, the screen may be displayed as part of a user interface provided to the primary user. Other participating users may be provided with other screens that, for example, indicate different shared financial goals and/or different relationships.

The screen 800 shows five example users, including the primary user indicated by user indicator 802A. A user indicator 802B indicates a second user. A user indicator 802C indicates a third user. A user indicator 802D indicates a fourth user. A user indicator 802E indicates a fifth user. Relationship indicator 822 shows the relationship between the users. For example, the primary user, the first user, and the second user are on the same level and may be equal participants. The fourth and fifth users may be subordinate to the primary user. For example, as shown, the primary user monitors user shapes 808D, 810E, 812E of the fourth and fifth subordinate users that correspond to shared financial goals in which the primary user does not participate. For example, the fourth and fifth users may be children of the primary user, employees of the primary user, etc.

In the example of FIG. 8, the primary user indicated by 802A is participating in two shared financial goals. A user shape 804A indicates the primary user's allocation to a first shared financial goal in which the second user indicated by user indicator 802B and the third user indicated by user indicator 802C are also participating users. For example, the second user's user shape 804B and the third user's user shape 804C are for the first financial goal. In the example FIG. 8, the user shapes 804A, 804B, 804C are complete when they extend 360 degrees around the user indicators 802A, 802B, 802C. Accordingly, the complete portions of user shapes 804A, 804B, 804C are the indicated arcs and the incomplete portions include the remainder of the circle around the user shapes 804A, 804B, 804C.

In the example of FIG. 8, the primary user also participates in a second shared financial goal indicated by user shape 806A. The second financial goal is shared with the third user indicated by user shape 802C and with the fifth user described by user indicator 802E. Respective user shapes 806A, 806C, and 806E describe the respective user's allocations to the second financial goal.

The example screen 800 also includes data describing shared financial goals for subordinate users in which the primary user does not participate by allocating funds. For example, the fourth user indicated by the user indicator 802D participates in a financial goal described by user shape 808D. Also, the fifth user indicated by user indicator 802E participates in two other financial goals described by user shapes 810E and 812E. A goal legend 820 may indicate which user shapes correspond to which goal. For example, different user shapes 804A, 804B, 804C, 806A, 806C, 808D, 810E, 812E may have different colors, textures, etc. The goal legend 820 includes correlations between the different colors, textures, etc. of the user shapes 804A, 804B, 804C, 806A, 806C, 808D, 810E, 812E and a textual or other indication of the corresponding goals.

Figure 9:
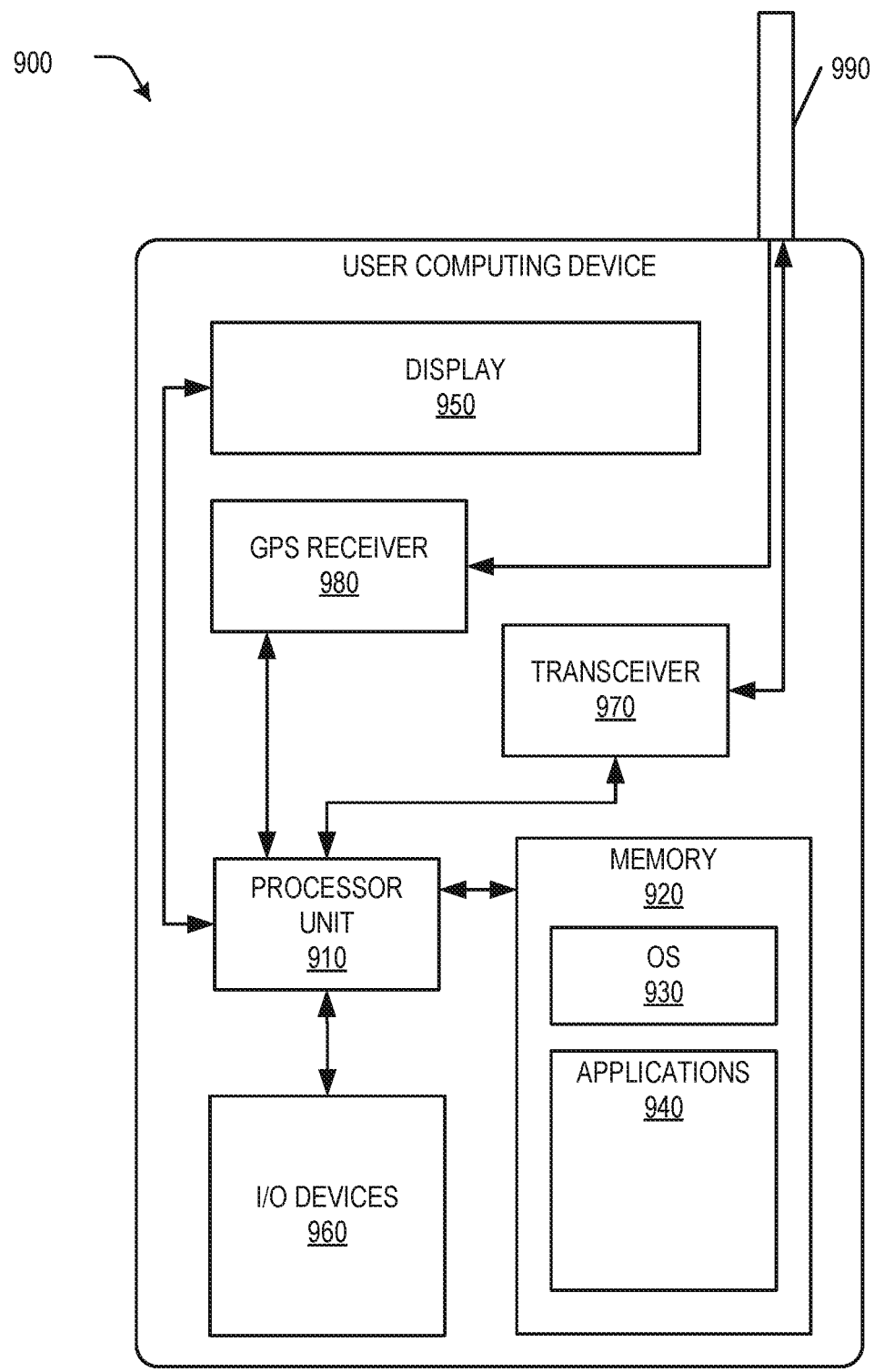
FIG. 9 is a block diagram showing an example architecture of a user computing device.

FIG. 9 is a block diagram showing an example architecture 900 of a user computing device. The architecture 900 may, for example, describe any of the computing devices or systems described herein, including, for example, the user computing devices 104A, 104B, 104N, the service computing system 102, etc. The architecture 900 comprises a processor unit 910. The processor unit 910 may include one or more processors. Any of a variety of different types of commercially available processors suitable for computing devices may be used (for example, an XScale architecture microprocessor, a Microprocessor without Interlocked Pipeline Stages (MIPS) architecture processor, or another type of processor). A memory 920, such as a Random Access Memory (RAM), a flash memory, or another type of memory or data storage, is typically accessible to the processor unit 910. The memory 920 may be adapted to store an operating system (OS) 930, as well as application programs 940.

The processor unit 910 may be coupled, either directly or via appropriate intermediary hardware, to a display 950 and to one or more I/O devices 960, such as a keypad, a touch panel sensor, a microphone, and the like. Such I/O devices 960 may include a touch sensor for capturing fingerprint data, a camera for capturing one or more images of the user, a retina scanner, or any other suitable devices. The I/O devices 960 may be used to implement I/O channels, as described herein. In some examples, the I/O devices 960 may also include sensors.

Similarly, in some examples, the processor unit 910 may be coupled to a transceiver 970 that interfaces with an antenna 990. The transceiver 970 may be configured to both transmit and receive cellular network signals, wireless data signals, or other types of signals via the antenna 990, depending on the nature of the computing device implemented by the architecture 900. Although one transceiver 970 is shown, in some examples, the architecture 900 includes additional transceivers. For example, a wireless transceiver may be utilized to communicate according to an IEEE 802.11 specification, such as Wi-Fi and/or a short-range communication medium. Some short-range communication mediums, such as NFC, may utilize a separate, dedicated transceiver. Further, in some configurations, a Global Positioning System (GPS) receiver 980 may also make use of the antenna 990 to receive GPS signals. In addition to or instead of the GPS receiver 980, any suitable location-determining sensor may be included and/or used, including, for example, a Wi-Fi positioning system. In some examples, the architecture 900 (e.g., the processor unit 910) may also support a hardware interrupt. In response to a hardware interrupt, the processor unit 910 may pause its processing and execute an interrupt service routine (ISR).

Figure 10:
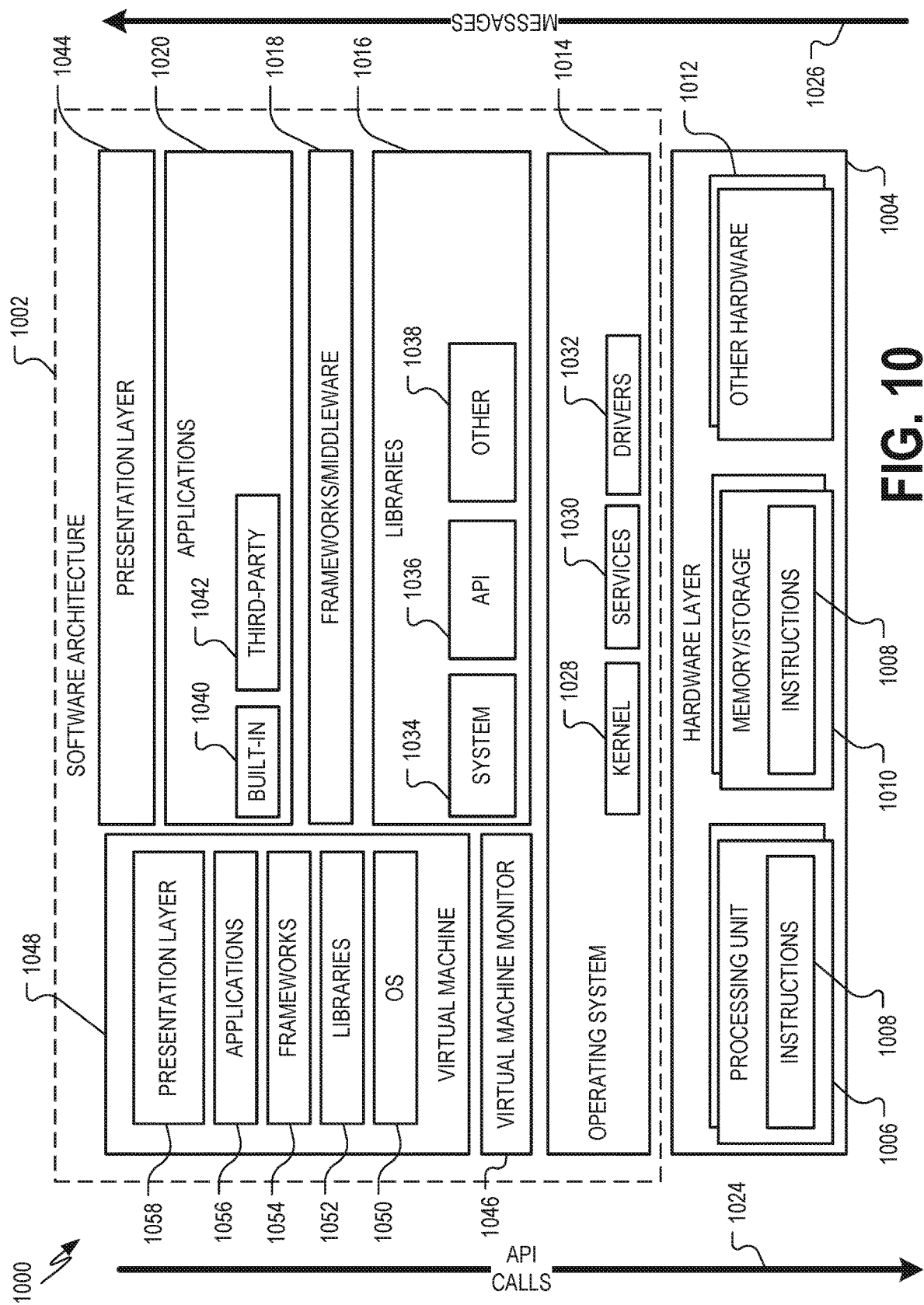
FIG. 10 is a block diagram showing one example of a software architecture for a computing device.

FIG. 10 is a block diagram 1000 showing one example of a software architecture 1002 for a computing device. The software architecture 1002 may be used in conjunction with various hardware architectures, for example, as described herein. FIG. 10 is merely a non-limiting example of a software architecture 1002, and many other architectures may be implemented to facilitate the functionality described herein. A representative hardware layer 1004 is illustrated and can represent, for example, any of the above-referenced computing devices. In some examples, the hardware layer 1004 may be implemented according to an architecture 1100 of FIG. 11 and/or the architecture 900 of FIG. 9.

The representative hardware layer 1004 comprises one or more processing units 1006 having associated executable instructions 1008. The executable instructions 1008 represent the executable instructions of the software architecture 1002, including implementation of the methods, modules, components, and so forth of FIGS. 1-10. The hardware layer 1004 also includes memory and/or storage modules 1010, which also have the executable instructions 1008. The hardware layer 1004 may also comprise other hardware 1012, which represents any other hardware of the hardware layer 1004, such as the other hardware illustrated as part of the architecture 1100.

In the example architecture of FIG. 10, the software architecture 1002 may be conceptualized as a stack of layers where each layer provides particular functionality. For example, the software architecture 1002 may include layers such as an operating system 1014, libraries 1016, frameworks/middleware 1018, applications 1020, and a presentation layer 1044. Operationally, the applications 1020 and/or other components within the layers may invoke application programming interface (API) calls 1024 through the software stack and receive a response, returned values, and so forth illustrated as messages 1026 in response to the API calls 1024. The layers illustrated are representative in nature and not all software architectures have all layers. For example, some mobile or special-purpose OSs may not provide a frameworks/middleware 1018 layer, while others may provide such a layer. Other software architectures may include additional or different layers.

The operating system 1014 may manage hardware resources and provide common services. The operating system 1014 may include, for example, a kernel 1028, services 1030, and drivers 1032. The kernel 1028 may act as an abstraction layer between the hardware and the other software layers. For example, the kernel 1028 may be responsible for memory management, processor management (e.g., scheduling), component management, networking, security settings, and so on. The services 1030 may provide other common services for the other software layers. In some examples, the services 1030 include an interrupt service. The interrupt service may detect the receipt of a hardware or software interrupt and, in response, cause the software architecture 1002 to pause its current processing and execute an ISR when an interrupt is received. The ISR may generate an alert.

The drivers 1032 may be responsible for controlling or interfacing with the underlying hardware. For instance, the drivers 1032 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 1016 may provide a common infrastructure that may be utilized by the applications 1020 and/or other components and/or layers. The libraries 1016 typically provide functionality that allows other software modules to perform tasks in an easier fashion than by interfacing directly with the underlying operating system 1014 functionality (e.g., kernel 1028, services 1030, and/or drivers 1032). The libraries 1016 may include system libraries 1034 (e.g., C standard library) that may provide functions such as memory allocation functions, string manipulation functions, mathematic functions, and the like. In addition, the libraries 1016 may include API libraries 1036 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1016 may also include a wide variety of other libraries 1038 to provide many other APIs to the applications 1020 and other software components/modules.

The frameworks 1018 (also sometimes referred to as middleware) may provide a higher-level common infrastructure that may be utilized by the applications 1020 and/or other software components/modules. For example, the frameworks 1018 may provide various graphical UI functions, high-level resource management, high-level location services, and so forth. The frameworks 1018 may provide a broad spectrum of other APIs that may be utilized by the applications 1020 and/or other software components/modules, some of which may be specific to a particular operating system or platform.

The applications 1020 include built-in applications 1040 and/or third-party applications 1042. Examples of representative built-in applications 1040 may include, but are not limited to, a contacts application, a browser application, a book reader application, a location application, a media application, a messaging application, and/or a game application. The third-party applications 1042 may include any of the built-in applications 1040 as well as a broad assortment of other applications. In a specific example, the third-party application 1042 (e.g., an application developed using the Android™ or iOS™ software development kit (SDK) by an entity other than the vendor of the particular platform) may be mobile software running on a mobile operating system such as iOS™, Android™ Windows® Phone, or other computing device operating systems. In this example, the third-party application 1042 may invoke the API calls 1024 provided by the mobile operating system such as the operating system 1014 to facilitate functionality described herein.

The applications 1020 may utilize built-in operating system functions (e.g., kernel 1028, services 1030, and/or drivers 1032), libraries (e.g., system libraries 1034, API libraries 1036, and other libraries 1038), or frameworks/middleware 1018 to create user interfaces to interact with users of the system. Alternatively, or additionally, in some systems, interactions with a user may occur through a presentation layer, such as the presentation layer 1044. In these systems, the application/module "logic" can be separated from the aspects of the application/module that interact with a user.

Some software architectures utilize virtual machines. For example, systems described herein may be executed utilizing one or more virtual machines executed at one or more server computing machines. In the example of FIG. 10, this is illustrated by a virtual machine 1048. A virtual machine creates a software environment where applications/modules can execute as if they were executing on a hardware computing device. The virtual machine 1048 is hosted by a host operating system (e.g., the operating system 1014) and typically, although not always, has a virtual machine monitor 1046, which manages the operation of the virtual machine 1048 as well as the interface with the host operating system (e.g., the operating system 1014). A software architecture executes within the virtual machine 1048, such as an operating system 1050, libraries 1052, frameworks/middleware 1054, applications 1056, and/or a presentation layer 1058. These layers of software architecture executing within the virtual machine 1048 can be the same as corresponding layers previously described or may be different.

Figure 11:
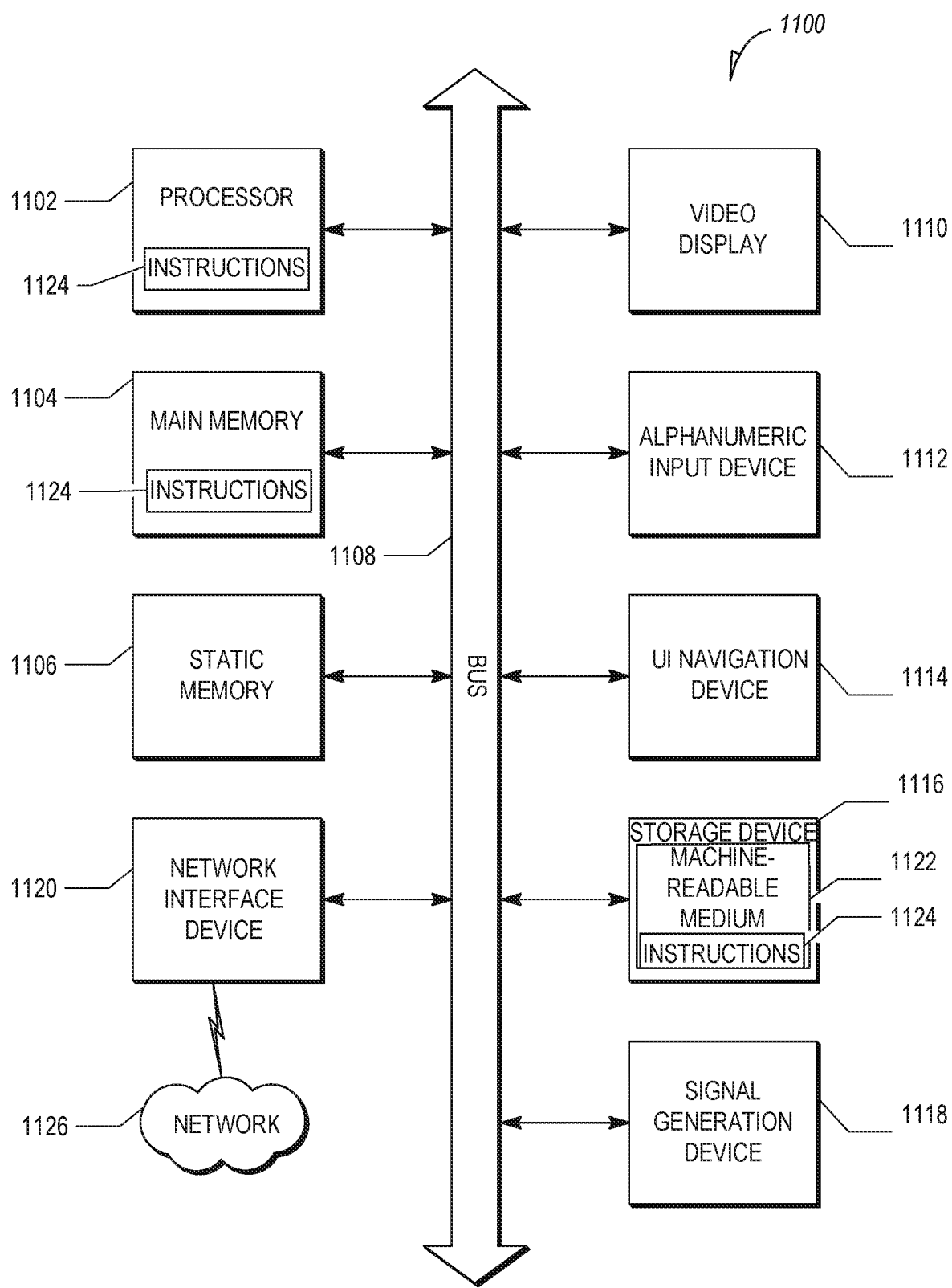
FIG. 11 is a block diagram illustrating a computing device hardware architecture, within which a set or sequence of instructions can be executed to cause a machine to perform examples of any one of the methodologies discussed herein.

FIG. 11 is a block diagram illustrating a computing device hardware architecture 1100, within which a set or sequence of instructions can be executed to cause a machine to perform examples of any one of the methodologies discussed herein. The architecture 1100 may describe, for example, any of the computing devices and/or control circuits described herein. The architecture 1100 may execute the software architecture 1002 described with respect to FIG. 10. The architecture 1100 may operate as a standalone device or may be connected (e.g., networked) to other machines. In a networked deployment, the architecture 1100 may operate in the capacity of either a server or a client machine in server-client network environments, or it may act as a peer machine in peer-to-peer (or distributed) network environments. The architecture 1100 can be implemented in a personal computer (PC), a tablet PC, a hybrid tablet, a set-top box (STB), a personal digital assistant (PDA), a mobile telephone, a web appliance, a network router, a network switch, a network bridge, or any machine capable of executing instructions (sequential or otherwise) that specify operations to be taken by that machine.

The example architecture 1100 includes a processor unit 1102 comprising at least one processor (e.g., a central processing unit (CPU), a graphics processing unit (GPU), or both, processor cores, compute nodes, etc.). The architecture 1100 may further comprise a main memory 1104 and a static memory 1106, which communicate with each other via a link 1108 (e.g., a bus). The architecture 1100 can further include a video display unit 1110, an alphanumeric input device 1112 (e.g., a keyboard), and a UI navigation device 1114 (e.g., a mouse). In some examples, the video display unit 1110, alphanumeric input device 1112, and UI navigation device 1114 are incorporated into a touchscreen display. The architecture 1100 may additionally include a storage device 1116 (e.g., a drive unit), a signal generation device 1118 (e.g., a speaker), a network interface device 1120, and one or more sensors (not shown), such as a GPS sensor, compass, accelerometer, or other sensor.

In some examples, the processor unit 1102 or another suitable hardware component may support a hardware interrupt. In response to a hardware interrupt, the processor unit 1102 may pause its processing and execute an ISR, for example, as described herein.

The storage device 1116 includes a machine-readable medium 1122 on which is stored one or more sets of data structures and instructions 1124 (e.g., software) embodying or utilized by any one or more of the methodologies or functions described herein. The instructions 1124 can also reside, completely or at least partially, within the main memory 1104, within the static memory 1106, and/or within the processor unit 1102 during execution thereof by the architecture 1100, with the main memory 1104, the static memory 1106, and the processor unit 1102 also constituting machine-readable media. The instructions 1124 stored at the machine-readable medium 1122 may include, for example, instructions for implementing the software architecture 1002, instructions for executing any of the features described herein, etc.

While the machine-readable medium 1122 is illustrated in an example to be a single medium, the term "machine-readable medium" can include a single medium or multiple media (e.g., a centralized or distributed database, and/or associated caches and servers) that store the one or more instructions 1124. The term "machine-readable medium" shall also be taken to include any tangible medium that is capable of storing, encoding, or carrying instructions for execution by the machine and that cause the machine to perform any one or more of the methodologies of the present disclosure, or that is capable of storing, encoding, or carrying data structures utilized by or associated with such instructions. The term "machine-readable medium" shall accordingly be taken to include, but not be limited to, solid-state memories, and optical and magnetic media. Specific examples of machine-readable media include non-volatile memory, including, but not limited to, by way of example, semiconductor memory devices (e.g., electrically programmable read-only memory (EPROM) and electrically erasable programmable read-only memory (EEPROM)) and flash memory devices; magnetic disks such as internal hard disks and removable disks; magneto-optical disks; and CD-ROM and DVD-ROM disks.

The instructions 1124 can further be transmitted or received over a communications network 1126 using a transmission medium via the network interface device 1120 utilizing any one of a number of well-known transfer protocols (e.g., hypertext transfer protocol (HTTP)). Examples of communication networks include a LAN, a WAN, the Internet, mobile telephone networks, plain old telephone service (POTS) networks, and wireless data networks (e.g., Wi-Fi, 3G, and 5G LTE/LTE-A or WiMAX networks). The term "transmission medium" shall be taken to include any intangible medium that is capable of storing, encoding, or carrying instructions for execution by the machine, and includes digital or analog communications signals or other intangible media to facilitate communication of such software.

Various components are described in the present disclosure as being configured in a particular way. A component may be configured in any suitable manner. For example, a component that is or that includes a computing device may be configured with suitable software instructions that program the computing device. A component may also be configured by virtue of its hardware arrangement or in any other suitable manner.

The above description is intended to be illustrative, and not restrictive. For example, the above-described examples (or one or more aspects thereof) can be used in combination with others. Other embodiments can be used, such as by one of ordinary skill in the art upon reviewing the above description. The Abstract is to allow the reader to quickly ascertain the nature of the technical disclosure, for example, to comply with 37 C.F.R. § 1.72(b) in the United States of America. It is submitted with the understanding that it will not be used to interpret or limit the scope or meaning of the claims.

Also, in the above Detailed Description, various features can be grouped together to streamline the disclosure. However, the claims cannot set forth every feature disclosed herein, as embodiments can feature a subset of said features. Further, embodiments can include fewer features than those disclosed in a particular example. Thus, the following claims are hereby incorporated into the Detailed Description, with each claim standing on its own as a separate embodiment. The scope of the embodiments disclosed herein is to be determined with reference to the appended claims, along with the full scope of equivalents to which such claims are entitled.

What is claimed is:

1. A method for interfacing a computing system to a plurality of users, the method comprising:
   determining, by the computing system, a set of user computing devices within a short-range wireless communication range of a first user computing device associated with a first user, the determining comprising directly contacting each user computing device of the set of user computing devices from the first user computing device via a short-range wireless communication medium, the computing system comprising a processor unit and associated memory;
   selecting, by the computing system and from the set of user computing devices, a list of user computing devices that are associated with the first user;
   prompting, by the computing system, the first user to select from the list of user computing devices at least a second user computing device associated with a second user to participate with the first user in a financial goal;
   accessing, by the computing system, user data describing the first user and user data describing the second user;
   determining, by the computing system, a portion of a first user account associated with the first user that is allocated to the financial goal;
   determining, by the computing system, a portion of a second user account associated with the second user that is allocated to the financial goal;
   generating, by the computing system, a graphical user interface screen, wherein the graphical user interface screen comprises:
      a first user shape;
      a first user arc extending through a fraction of 360° around the first user shape, the fraction of 360° around the first user shape occupied by the first user arc indicating a portion of the financial goal attributed to the user that is met by the portion of the first user account that is allocated to the financial goal, a remainder of the 360° around the first user shape not occupied by the first user arc indicating an incomplete portion of the portion of the financial goal attributed to the first user; and
      a second user shape;
      a second user arc extending through a fraction of 360° around the second user shape, the fraction of 360° around the second user shape occupied by the second user arc indicating a portion of the financial goal attributed to the user that is met by the portion of the second user account that is allocated to the financial goal, a remainder of the 360° around the second user shape not occupied by the second user arc indicating an incomplete portion of the portion of the financial goal attributed to the second user;
   sending, by the computing system, the graphical user interface screen to the first user computing device; and
   sending, by the computing system, the graphical user interface screen to the second user computing device.

2. The method of claim 1, wherein determining the portion of the first user account that is allocated to the financial goal comprises:
   querying an account table to retrieve account data associated with the first user, wherein the account data comprises first balance data describing the first user account and first user data describing the first user;
   querying a goal table to retrieve first user goal record; and
   determining the portion of the first user account that is allocated to the financial goal based at least in part on the first user goal record.

3. The method of claim 2, wherein the querying of the goal table is based at least in part on the first user data describing the first user.

4. The method of claim 1, further comprising:
   determining that the portion of the first user account allocated to the financial goal is less than a target allocation; and
   sending an alert message to the second user computing device, wherein the alert message indicates that the first user is delinquent on the financial goal.

5. The method of claim 1, further comprising:
   receiving actual expense data describing actual expenses for the financial goal;
   determining an allocation of the actual expenses between at least the first user and the second user; and
   sending to the first user computing device an actual expense message indicating the actual expenses for the financial goal.

6. The method of claim 5, further comprising:
   determining that a set of users comprising the first user and the second user have settled their allocations to the financial goal; and
   sending a message indicating that the first user and the second user have settled their allocations to the financial goal.

7. The method of claim 1, further comprising:
   determining a third user to be associated with the financial goal; and
   sending to the first user computing device a goal participant suggestion message indicating a third user.

8. The method of claim 1, wherein the determining the set of user computing devices within the short-range wireless communication range of the first user computing device comprises receiving from the first user computing device an indication of a set of user computing devices contacted by the first user computing device via a short-range communication medium.

9. The method of claim 1, further comprising:
   receiving audio data from the first user computing device, the audio data describing speech of the first user;
   selecting the financial goal based at least in part on the audio data; and
   providing a goal suggestion message to the first user computing device including a description of the financial goal.

10. A system for interfacing a computing system to a plurality of users, the system comprising:

a computing device comprising at least one processor unit, wherein the computing device is programmed to perform operations comprising:
  determining, by the computing system, a set of user computing devices within a short-range wireless communication range of a first user computing device associated with a first user, the determining comprising directly contacting each user computing device of the set of user computing devices from the first user computing device via a short-range wireless communication medium;
  selecting from the set of user computing devices, a list of user computing devices that are associated with the first user;
  prompting the first user to select from the list of user computing devices at least a second user computing device associated with a second user to participate with the first user in a financial goal;
  accessing user data describing the first user and user data describing the second user;
  determining a portion of a first user account associated with the first user that is allocated to the financial goal;
  determining a portion of a second user account associated with the second user that is allocated to the financial goal;
  generating a graphical user interface, screen, wherein the graphical user interface screen comprises:
    a first user shape;
    a first user arc extending through a fraction of 360° around the first user shape, the fraction of 360° around the first user shape occupied by the first user arc indicating a portion of the financial goal attributed to the user that is met by the portion of the first user account that is allocated to the financial goal, a remainder of the 360° around the first user shape not occupied by the first user arc indicating an incomplete portion of the portion of the financial goal attributed to the first user; and
    a second user shape;
    a second user arc extending through a fraction of 360° around the second user shape, the fraction of 360° around the second user shape occupied by the second user arc indicating a portion of the financial goal attributed to the user that is met by the portion of the second user account that is allocated to the financial goal, a remainder of the 360° around the second user shape not occupied by the second user arc indicating an incomplete portion of the portion of the financial goal attributed to the second user;
  sending the graphical user interface screen to the first user computing device; and
  sending the graphical user interface screen to the second user computing device.

11. The system of claim 10, wherein determining the portion of the first user account that is allocated to the financial goal comprises:
  querying an account table to retrieve account data associated with the first user, wherein the account data comprises first balance data describing the first user account and first user data describing the first user;
  querying a goal table to retrieve first user goal record; and
  determining the portion of the first user account that is allocated to the financial goal based at least in part on the first user goal record.

12. The system of claim 11, wherein the querying of the goal table is based at least in part on the first user data describing the first user.

13. The system of claim 10, wherein the computing device is programmed to perform operations further comprising:
  determining that the portion of the first user account allocated to the financial goal is less than a target allocation; and
  sending an alert message to the second user computing device, wherein the alert message indicates that the first user is delinquent on the financial goal.

14. The system of claim 10, wherein the computing device is programmed to perform operations further comprising:
  receiving actual expense data describing actual expenses for the financial goal;
  determining an allocation of the actual expenses between at least the first user and the second user; and
  sending to the first user computing device an actual expense message indicating the actual expenses for the financial goal.

15. The system of claim 14, wherein the computing device is programmed to perform operations further comprising:
  determining that a set of users comprising the first user and the second user have settled their allocations to the financial goal; and
  sending a message indicating that the first user and the second user have settled their allocations to the financial goal.

16. The system of claim 10, wherein the computing device is programmed to perform operations further comprising:
  determining a third user to be associated with the financial goal; and
  sending to the first user computing device a goal participant suggestion message indicating a third user.

17. The system of claim 10, wherein the determining the set of user computing devices within the short-range communication range of the first user computing device comprises receiving from the first user computing device an indication of a set of user computing devices contacted by the first user computing device via a short-range communication medium.

18. The system of claim 10, wherein the computing device is programmed to perform operations further comprising:
  receiving audio data from the first user computing device, the audio data describing speech of the first user;
  selecting the financial goal based at least in part on the audio data; and
  providing a goal suggestion message to the first user computing device including a description of the financial goal.

19. A machine-readable medium comprising instructions thereon that, when executed by at least one processor unit, cause the at least one processor unit to perform operations comprising:
  determining a set of user computing devices within a short-range wireless communication range of a first user computing device associated with a first user, the determining comprising directly contacting each user computing device of the set of user computing devices from the first user computing device via a short-range wireless communication medium;
  selecting from the set of user computing devices, a list of user computing devices that are associated with the first user;
  prompting the first user to select from the list of user computing devices at least a second user computing device associated with a second user to participate with the first user in a financial goal;

accessing user data describing the first user and user data describing the second user;

determining a portion of a first user account associated with the first user that is allocated to the financial goal;

determining a portion of a second user account associated with the second user that is allocated to the financial goal;

generating a graphical user interface screen, wherein the graphical user interface screen comprises:
  a first user shape;
  a first user arc extending through a fraction of 360° around the first user shape, the fraction of 360° around the first user shape occupied by the first user arc indicating a portion of the financial goal attributed to the user that is met by the portion of the first user account that is allocated to the financial goal, a remainder of the 360° around the first user shape not occupied by the first user arc indicating an incomplete portion of the portion of the financial goal attributed to the first user; and
  a second user shape;
  a second user arc extending through a fraction of 360° around the second user shape, the fraction of 360° around the second user shape occupied by the second user arc indicating a portion of the financial goal attributed to the user that is met by the portion of the second user account that is allocated to the financial goal, a remainder of the 360° around the second user shape not occupied by the second user arc indicating an incomplete portion of the portion of the financial goal attributed to the second user;

sending the graphical user interface screen to the first user computing device; and sending the graphical user interface screen to the second user computing device.

20. The medium of claim 19, wherein determining the portion of the first user account that is allocated to the financial goal comprises:
  querying an account table to retrieve account data associated with the first user, wherein the account data comprises first balance data describing the first user account and first user data describing the first user;
  querying a goal table to retrieve first user goal record; and
  determining the portion of the first user account that is allocated to the financial goal based at least in part on the first user goal record.

\* \* \* \* \*